United States Patent [19]

Abdulally

[11] Patent Number: 5,140,950
[45] Date of Patent: Aug. 25, 1992

[54] FLUIDIZED BED COMBUSTION SYSTEM AND METHOD HAVING AN INTEGRAL RECYCLE HEAT EXCHANGER WITH RECYCLE RATE CONTROL AND BACKFLOW SEALING

[75] Inventor: Igbal F. Abdulally, Randolph, N.J.

[73] Assignee: Foster Wheeler Energy Corporation, Clinton, N.J.

[21] Appl. No.: 700,294

[22] Filed: May 15, 1991

[51] Int. Cl.$^5$ .......................... B09B 3/00; F22B 1/00
[52] U.S. Cl. .................................. 122/4 D; 110/245; 165/104.16; 422/145; 422/146
[58] Field of Search .................. 122/4 D; 110/245; 165/104.16, 104.18; 422/139, 145, 146

[56] References Cited

U.S. PATENT DOCUMENTS

| | | |
|---|---|---|
| 3,893,426 | 7/1975 | Bryers . |
| 4,111,158 | 9/1978 | Reh et al. . |
| 4,165,717 | 8/1979 | Reh et al. . |
| 4,227,488 | 10/1980 | Stewart et al. . |
| 4,338,283 | 7/1982 | Sakamoto et al. . |
| 4,469,050 | 9/1984 | Korenberg . |
| 4,594,967 | 6/1986 | Wolowodiuk . |
| 4,617,877 | 10/1986 | Gamble . |
| 4,665,864 | 5/1987 | Seshamani et al. . |
| 4,682,567 | 7/1987 | Garcia-Mallol et al. . |
| 4,686,939 | 8/1987 | Stromberg . |
| 4,694,758 | 9/1987 | Gorzegno et al. . |
| 4,704,084 | 11/1987 | Liu et al. . |
| 4,709,662 | 12/1987 | Rawdon . |
| 4,716,856 | 1/1988 | Beisswenger et al. . |
| 4,761,131 | 8/1988 | Abdulally . |
| 4,813,479 | 3/1989 | Wahlgren . |
| 4,856,460 | 8/1989 | Wied et al. . |
| 4,896,717 | 1/1990 | Campbell, Jr. et al. ....... 165/104.18 |
| 4,947,804 | 8/1990 | Abdulally . |
| 4,969,930 | 11/1990 | Arpalahti . |
| 5,054,436 | 10/1991 | Dietz .................. 122/4 D |

*Primary Examiner*—Edward G. Favors
*Attorney, Agent, or Firm*—Marvin A. Naigur

[57] ABSTRACT

A fluidized bed combustion system and method in which a recycle heat exchange section, including an inlet compartment and a heat exchange compartment, is located within an enclosure housing the furnace section of the combustion system. The flue gases and entrained solids from a fluidized bed in the furnace section are separated, the flue gases are passed to a heat recovery section, and the separated particulate material is passed directly to the inlet compartment via a dipleg. The recycle heat exchange section includes a bypass chamber for permitting the separated solids to pass directly from the inlet compartment to the furnace section. Heat exchange tubes are provided in the heat exchange compartment to transfer heat from the separated material in the latter compartment to a fluid flow circuit for heating the fluid flow circuit. The separated material in the heat exchange compartment is passed back to the furnace section. Air is introduced into the inlet compartment below the dipleg and in alignment therewith to control the flow of separated material from the separator and therefore the recycle rate.

24 Claims, 3 Drawing Sheets

FLUIDIZED BED COMBUSTION SYSTEM AND METHOD HAVING AN INTEGRAL RECYCLE HEAT EXCHANGER WITH RECYCLE RATE CONTROL AND BACKFLOW SEALING

BACKGROUND OF THE INVENTION

This invention relates to a fluidized bed combustion system and a method of operating same and, more particularly, to such a system and method in which a recycle heat exchanger is formed integrally with the furnace section of the system.

Fluidized bed combustion systems are well known and include a furnace section in which air is passed through a bed of particulate material, including a fossil fuel, such as coal, and a sorbent for the oxides of sulfur generated as a result of combustion of the coal, to fluidize the bed and to promote the combustion of the fuel at a relatively low temperature. These types of combustion systems are often used in steam generators in which water is passed in a heat exchange relationship to the fluidized bed to generate steam and permit high combustion efficiency and fuel flexibility, high sulfur adsorption and low nitrogen oxides emissions.

The most typical fluidized bed utilized in the furnace section of these type systems is commonly referred to as a "bubbling" fluidized bed in which the bed of particulate material has a relatively high density and a well defined, or discrete, upper surface. Other types of systems utilize a "circulating" fluidized bed in which the fluidized bed density is below that of a typical bubbling fluidized bed, the fluidizing air velocity is equal to or greater than that of a bubbling bed, and the flue gases passing through the bed entrain a substantial amount of the fine particulate solids to the extent that they are substantially saturated therewith.

Circulating fluidized beds are characterized by relatively high internal and external solids recycling which makes them insensitive to fuel heat release patterns, thus minimizing temperature variations and, therefore, stabilizing the sulfur emissions at a low level. The high external solids recycling is achieved by disposing a cyclone separator at the furnace section outlet to receive the flue gases, and the solids entrained thereby, from the fluidized bed. The solids are separated from the flue gases in the separator and the flue gases are passed to a heat recovery area while the solids are recycled back to the furnace. This recycling improves the efficiency of the separator, and the resulting increase in the efficient use of sulfur adsorbent and fuel residence times reduces the adsorbent and fuel consumption.

In the operation of these types of fluidized beds, and, more particularly, those of the circulating type, there are several important considerations. For example, the flue gases and entrained solids must be maintained in the furnace section at a particular temperature (usually approximately 1600° F.) consistent with proper sulfur capture by the adsorbent. As a result, the maximum heat capacity (head) of the flue gases passed to the heat recovery area and the maximum heat capacity of the separated solids recycled through the cyclone and to the furnace section are limited by this temperature. In a cycle requiring only superheat duty and no reheat duty, the heat content of the flue gases at the furnace section outlet is usually sufficient to provide the necessary heat for use in the heat recovery area of the steam generator downstream of the separator. Therefore, the heat content of the recycled solids is not needed.

However, in a steam generator using a circulating fluidized bed with sulfur capture and a cycle that requires reheat duty as well as superheater duty, the existing heat available in the flue gases at the furnace section outlet is not sufficient. At the same time, heat in the furnace cyclone recycle loop is in excess of the steam generator duty requirements. For such a cycle, the design must be such that the heat in the recycled solids must be utilized before the solids are reintroduced to the furnace section.

To provide this extra heat capacity, a recycle heat exchanger is sometimes located between the separator solids outlet and the fluidized bed of the furnace section. The recycle heat exchanger includes heat exchange surfaces and receives the separated solids from the separator and functions to transfer heat from the solids to the heat exchange surfaces at relatively high heat transfer rates before the solids are reintroduced to the furnace section. The heat from the heat exchange surfaces is then transferred to cooling circuits to supply reheat and/or superheat duty.

The simplest technique for controlling the amount of heat transfer in the recycle heat exchanger is to vary the level of solids therein. However, situations exist in which a sufficient degree of freedom in choosing the recycle bed height is not available, such as for example, when a minimum fluidized bed solids depth or pressure is required for reasons unrelated to heat transfer. In this case, the heat transfer may be controlled by utilizing "plug valves" or "L valves" for diverting a portion of the recycled solids so that they do not give up their heat in the recycle heat exchanger. The solids from the diverting path and from the heat exchanger path are recombined, or each stream is directly routed to the furnace section, to complete the recycle path. In this manner, the proper transfer of heat to the heat exchanger surface is achieved for the unit load existing. However, these type arrangements require the use of moving parts within the solids system and/or need external solids flow conduits with associated aeration equipment which adds considerable cost to the system.

In order to reduce these costs, a system has been devised that is disclosed in U.S. application Ser. No. 371.170 filed on Jun. 26, 1989 by the assignee of the present invention. According to this system, a recycle heat exchanger is provided for receiving the separated solids and distributing them back to the fluidized bed in the furnace section. The recycle heat exchanger is located externally of the furnace section of the system and includes an inlet chamber for receiving the solids discharged from the separators. Two additional chambers are provided which receive the solids from the inlet chamber. The solids are fluidized in the additional chambers and heat exchange surfaces are provided in one of the additional chambers for extracting heat from the solids. The solids in the additional chamber are permitted to flow into an outlet chamber when the level in the former chamber exceeds a predetermined height set by the height of an overflow weir. The solids entering the outlet chamber are then discharged back to the fluidized bed in the furnace section.

However, there are some disadvantages associated with this type of operation. For example, there is no dedicated structure provided for preventing the backflow of separated solids from the furnace section to the outlet of the separator. Also, the space available for heat exchanger surfaces is limited and pressure fluctuations in the furnace section are transmitted to the external heat exchanger which results in erratic performance. Also, the solids are directed from the heat exchanger to one relatively small area of the furnace section which is inconsistent with uniform mixing and distribution of the solids.

In order to overcome these disadvantages, a combustion system and method was devised which is disclosed in co pending application Ser. No. 486,652 U.S. Pat. No. 5,069,170 which is assigned to the same assignee as the present invention. In this system, a recycle heat exchange section is located within an enclosure housing the furnace section of the combustion system. The flue gases and entrained solids from a fluidized bed in the furnace section are separated and the flue gases are passed to a heat recovery section and the separated particulate material to the recycle heat exchange section. The recycle heat exchange section includes a bypass chamber for permitting the separated solids to pass directly from the separator to the furnace section. Heat exchange tubes are provided in the recycle heat exchange section to transfer heat from the separated material in the recycle heat exchange section to a fluid flow circuit for heating the fluid and reducing the temperature of the separated material. The separated material of the recycle heat exchange section is then passed back to the furnace section. A loop seal, including a J Valve, is provided between the separator outlet and the inlet to the recycle heat exchanger to prevent backflow of the separated solids from the furnace section to the separator. The heat exchange tubes are disposed in a relatively large area between transverse inlet and outlet chambers to insure a uniform distribution of the separated solids through the recycle heat exchanger to increase the heat exchange efficiency and insure a uniform discharge of solids to the furnace. The recycle heat exchanger is isolated from pressure fluctuations in the furnace and the solids are driven from the recycle heat exchanger to the furnace by height differentials.

Although this system and method provided distinct improvements over the prior art, the "J"-valve between each cyclone separator and the recycle heat exchanger added to the cost of the system. Also, the cyclone separators had to be fairly precisely located and the number of separators used could not be varied, which minimized the flexibility of the system.

Also in connection with these type of steam generators, and especially those using a circulating fluidized bed, load is controlled by regulating the solids recycle rate. Although this can be achieved by reducing the solids inventory from the above mentioned loop seal, it normally requires the use of a metering cooler, such as a water cooled screw, to remove solids from the recycle system. This adds mechanical complexity and costs penalties in addition to requiring downstream handling equipment. In U.S. Pat. No. 4,781,574 issued Nov. 1, 1988, and assigned to the assignee of the present invention, this latter problem was addressed by disposing an air source at the separated solids outlet of a cyclone separator and discharging air into the separator in a direction opposite the direction of flow of the separated solids. The air entrained a portion of the solids and was passed back through the separator and to the heat recovery area. Although this technique enabled the solids inventory to be controlled without incurring significant additional costs, it interfered with the operation of the separator.

SUMMARY OF THE INVENTION

It is therefore an object of the present invention to provide a fluidized bed combustion system and method of the type disclosed in the above identified patent application, yet enjoys further improvements over the prior art.

It is a further object of the present invention to provide a system and method of the above type in which the recycle heat exchanger includes heat exchanger surfaces disposed in a relatively large are between inlet and outlet compartments to insure a uniform distribution of the separated solids through the recycle heat exchanger to increase the heat exchange efficiency and insure a uniform discharge of solids to the furnace.

It is a still further object of the present invention to provide a system and method of the above type in which the recycle heat exchanger is isolated from pressure fluctuations in the furnace and the solids are driven from the recycle heat exchanger to the furnace by height differentials.

It is a further object of the present invention to provide a system and method of the above type which eliminates the need for expensive J-valves and associated ducting.

It is a still further object of the present invention to provide a system and method of the above type in which the number of cyclone separators can be varied.

It is further object of the present invention to provide a method and system of the above type in which a metering device and downstream handling equipment is eliminated.

It is a further object of the present invention to provide a system and method of the above type in which the recycle rate is controlled by continuously removing recycled solids from the inlet chamber of the recycle heat exchanger.

Toward the fulfillment of these and other objects, the system of the present invention includes a recycle heat exchanger located adjacent the furnace section of the system. The flue gases and entrained particulate materials from the fluidized bed in the furnace section are separated, the flue gases are passed to a heat recovery area and the separated solids are passed to the recycle heat exchanger for transferring heat from the solids to fluid passing through the system. Heat exchange surfaces are provided in the heat exchanger for removing heat from the solids and a bypass passage is provided through which the solids pass during start-up and low load conditions. Inlet compartments are provided in the heat exchanger for receiving the separated solids directly from the cyclone separator and air is introduced into the inlet compartments in two paths in a direction generally opposite to that of the flow of the separated solids through the vessel. One of the latter air flow paths is from a location below the separator dipleg and in alignment therewith, and the other flow path surrounds the first flow path. The air flow through each path can be separately adjusted as necessary to facilitate the recycle of solids.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing wherein.

DESCRIPTION OF THE PREFERRED EMBODIMENT

Figure 2:
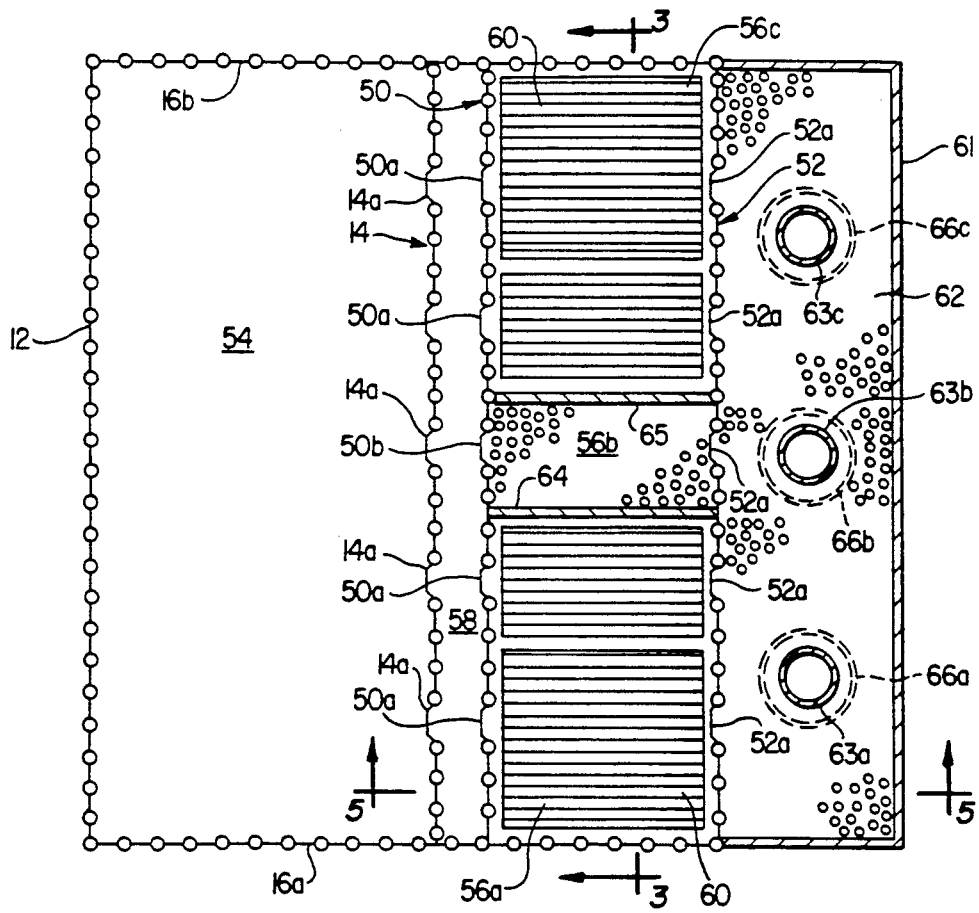
FIG. 2 is an enlarged cross sectional view taken along the line 2—2 of FIG. 1.
Figure 3:
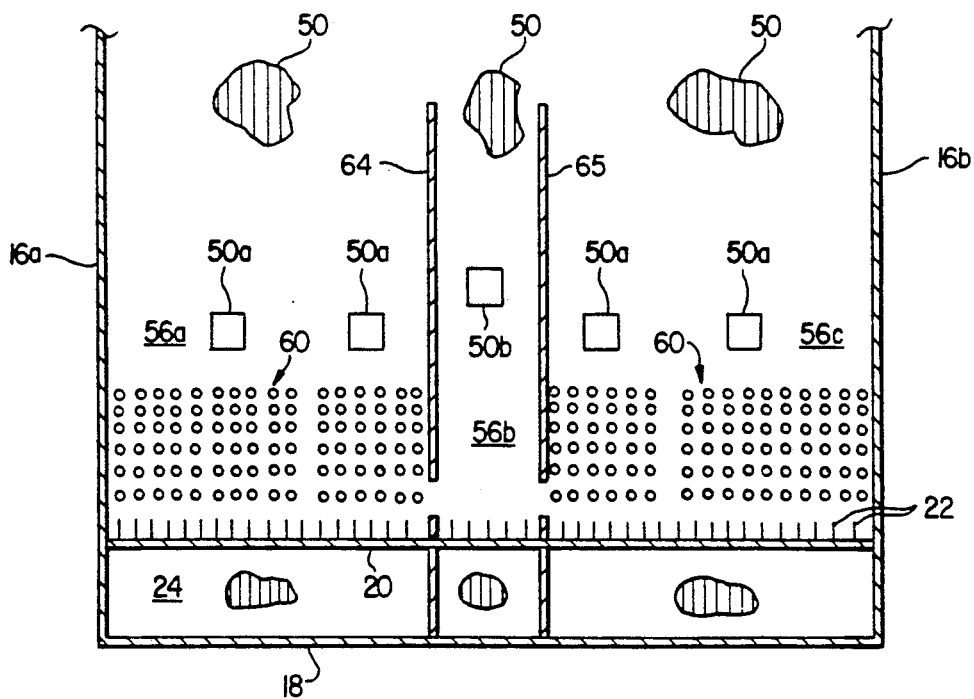
FIG. 3 is an enlarged, cross sectional view taken along the line 3—3 of FIG. 2.

The drawings depict the fluidized bed combustion system of the present invention used for the generation of steam and including an upright water-cooled enclosure, referred to in general by the reference numeral 10, having a front wall 12, a rear wall 14 and two sidewalls 16a and 16b (FIGS. 2 and 3). The upper portion of the enclosure 10 is enclosed by a roof 17 and the lower portion includes a floor 18.

A plurality of air distributor nozzles 20 are mounted in corresponding openings formed in a plate 22 extending across the lower portion of the enclosure 10 The plate 22 is spaced from the floor 18 to define an air plenum 24 which is adapted to receive a gas, such as air, from an external source (not shown) and selectively distribute the air through the plate 22 and to portions of the enclosure 10, as will be described.

A feeder system, shown in general by the reference numeral 25, is provided adjacent the front wall 12 for introducing particulate fuel into the enclosure 10. An adsorbent, such as limestone, is introduced, via a pipe 25', into the outlet pipe of the coal feeder system from which it also is introduced into the enclosure 10. The mixture of coal and adsorbent particulate material is fluidized by the air from the plenum 24 as it passes upwardly through the plate 22. This air promotes the combustion of the fuel and the limestone adsorbs the sulfar generated by the combustion of the fuel. The resulting mixture of combustion gases and the air (hereinafter termed "flue gases") rises in the enclosure by forced convection and entrains a portion of the solids to form a column of decreasing solids density in the upright enclosure 10 to a given elevation, above which the density remains substantially constant.

A cyclone separator 26 extends adjacent the enclosure 10 and is connected thereto via a duct 28 extending from an outlet provided in the rear wall 14 of the enclosure 10 to an inlet provided through the separator wall. Although reference is made to one separator 26, it is understood that one or more additional separators (not shown) may be disposed behind the separator 26. The number and size of separators used is determined by the capacity of the steam generator and economic considerations.

The separator 26 receives the flue gases and the entrained particle material from the enclosure 10 in a manner to be described and operates in a conventional manner to disengage the particulate material from the flue gases due to the centrifugal forces created in the separator. The separated flue gases, which are substantially free of solids, pass, via a duct 30 located immediately above the separator 26, into a heat recovery section shown in general by the reference numeral 32.

The heat recovery section 32 includes an enclosure 34 divided by a vertical partition 36 into a first passage which houses a reheater 38, and a second passage which houses a primary superheater 40 and an upper economizer 42, all of which are formed by a plurality of heat exchange tubes extending in the path of the flue gases as they pass through the enclosure 34. An opening 36a is provided in the upper portion of the partition 36 to permit a portion of the gases to flow into the passage containing the superheater 40 and the upper economizer 42. After passing across the reheater 38, the superheater 40 and the upper economizer 42 in the two parallel passes, the gases pass through a lower economizer 44 before existing the enclosure 34 through an outlet 46.

Figure 1:
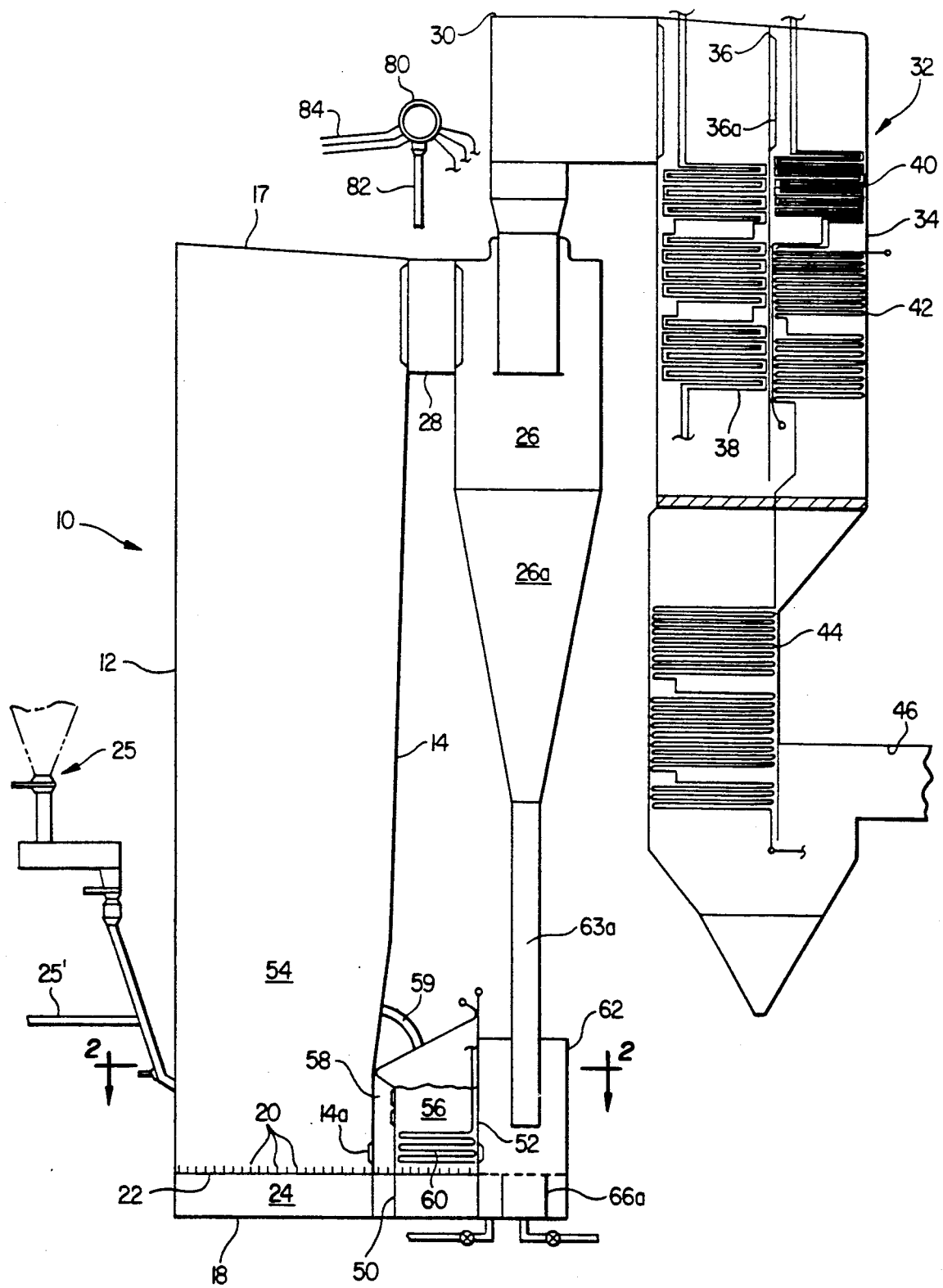
FIG. 1 is a schematic representation depicting the system of the present invention.
Figure 5:
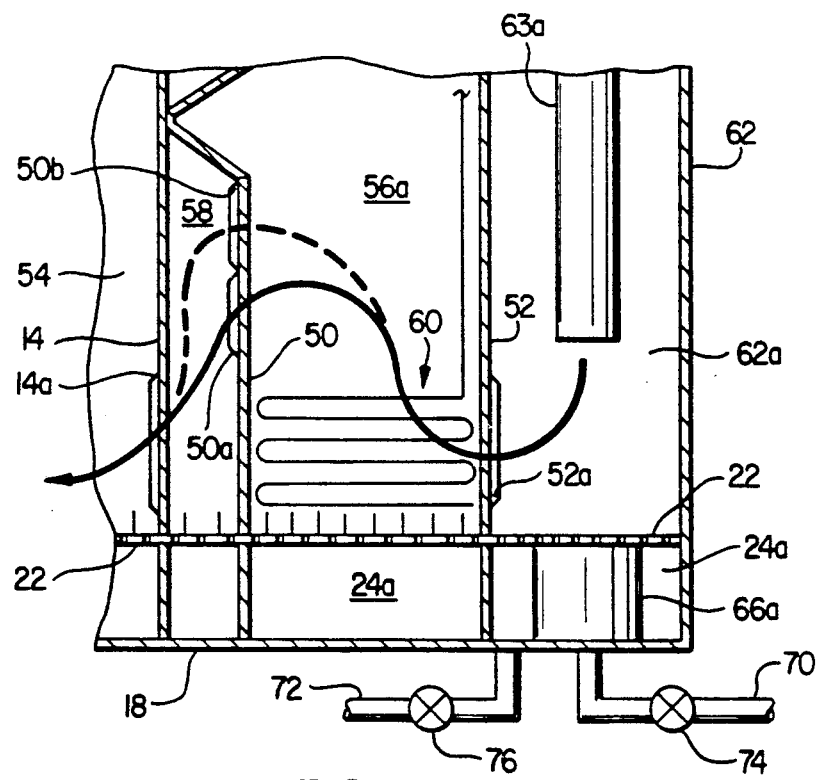
FIG. 5 is an enlarged sectional view taken along the line 5—5 of FIG. 1.

As shown in FIGS. 1 and 5, the floor 18 and the plate 22 are extended past the rear wall 14 and a pair of vertically extending, spaced, parallel partitions 50 and 52 extend upwardly from the floor 18. The upper portion of the partition 50 is bent towards the wall 14 to form a sealed boundary, and then towards the partition 52 with its upper end extending adjacent, and slightly bent back from, the latter wall, to form another sealed boundary. Several openings are provided through the wall 14 and the partitions 50 and 52 to establish flow paths for the solids, as will be described.

The front wall 12 and the rear wall 14 define a furnace section 54 (FIG. 1), the partitions 50 and 52 define a heat exchanger enclosure 56 and the rear wall 14 and the partition 50 define an outlet chamber 58 for the enclosure 56 which chamber is sealed off at its upper portion by the bent portion of the partition 50. A vent pipe 59 connects an opening in the rear wall 14 with an opening in the partition 50 to place the furnace section 54 and the heat exchanger enclosure 56 in communication for reasons to be described. A plurality of heat exchange tubes 60 are disposed in the heat exchanger enclosure 56 and will be described in detail later.

A subenclosure 61 is mounted on the outer surface of the partition 52 to define an inlet compartment 62 extending between the sidewalls 16a and 16b. The floor 18 and the plate 22, and therefore the plenum 24, extend through the chamber 58, the enclosure 56 and the compartment 62.

The plenum 24 is thus divided into a plurality of sections respectively extending below the furnace section 54, the heat exchanger enclosure 56 and the outlet chamber 58. Although omitted from the drawings for the convenience of presentation it is understood that each of these plenum sections are provided with conduits, valves, dampers or the like to introduce and control a flow of air through the sections as will be described. Additional nozzles 20 are provided through the extended portions of the plate 22 to introduce the air into the chamber 58, the enclosure 56 and the compartment 62.

The lower portion of the separator 26 includes a cone section 26a which is connected to a dip leg 63a which extends directly into the inlet compartment 62 to transfer the separated solids from the separator 26 to the latter compartment. The reference numerals 63b and 63c (FIG. 2) refers to the diplegs associated with two additional separators disposed behind the separator 26.

As shown in FIGS. 2 and 3, a pair of partitions 64 and 65 extend between, and perpendicular to, the partitions 50 and 52 to divide the heat exchanger enclosure 56 into three compartments 56a, 56b and 56c.

The heat exchange tubes 60 are shown schematically in FIGS. 2 and 3, and are located in the compartments 56a and 56c where they are divided into two spaced groups as shown to permit the installation of spray attemperation units (not shown) in the space for temperature control of superheat. The partitions 64 and 65 extend to the floor 18 and thus divide that portion of the plenum 24 extending below the heat exchanger enclosure 56 into three sections (FIG. 3) respectively extending immediately below the heat exchanger compartments 56a, 56b and 56c. It is understood that conduits, valves, dampers, or the like, (not shown) can be provided to selectively distribute air to the individual sections of the plenum 24 extending below the compartments 56a, 56b and 56c. Also, drain pipes (not shown) can extend from enlarged openings in the plate 24 and through the floor 18 for permitting the spent bed material to be discharged to external equipment.

As better shown in FIG. 2, three spaced cylindrical partitions 66a, 66b and 66c are disposed in the plenum section 29 extending below the compartment 62 below, and in registery with, the diplegs 63a, 63b and 63c, respectively. As shown in FIG. 5, a conduit 70 extends through the floor 18 and into the plenum 24 and registers with the area defined by the partition 66a. A conduit 72 extends through the floor 18 and registers with the remaining portion of the plenum 24 extending below the inlet compartment 62. The conduits 70 and 72 function to introduce air from a source (not shown) into their respective portions of that portion of the plenum 24 extending below the inlet compartment 62, and two valves 74 and 76 are provided in the conduits 70 and 72, respectively, for controlling the flow rate of the air. It is understood that a conduit and valve identical to the conduit 70 and valve 74 are associated with each of the partitions 66b and 66c.

Four horizontally-spaced openings (FIG. 2) 52a are provided in the lower portion of the partition 52 to connect the compartment 62 to the enclosure 56 so that the particulate material from the former passes into the interior of the latter. Four spaced openings 50a (FIGS. 2 and 3) are formed in an intermediate portion of those portions of the partition 50 defining the compartments 56a and 56c. An opening 50b is also formed in that portion of the partition 50 defining the compartment 56b and extends at an elevation higher than the openings 52a. Five horizontally-spaced openings 14a (FIGS. 1, 2 and 5) are formed in the lower portion of the rear wall 14.

Figure 4:
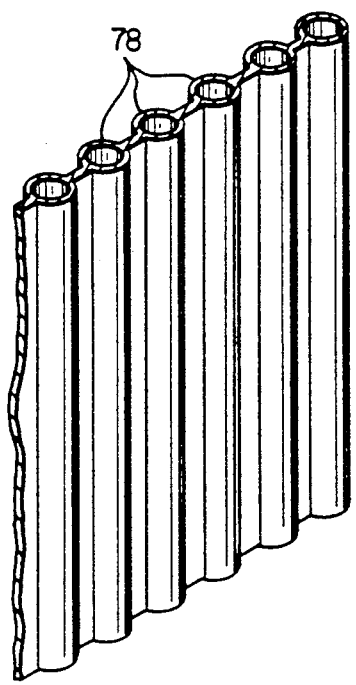
FIG. 4 is an enlarged partial, enlarged perspective view of a portion of a wall of the enclosure of the system of FIG. 1.

The front wall 12, the rear wall 14, the sidewalls 16a and 16b, the partitions 50 and 52, the roof 17, and the walls defining the heat recovery enclosure 34 and the subenclosure 61 all are formed of membrane-type walls an example of which is depicted in FIG. 4. As shown, each wall is formed by a plurality of finned tubes 78 disposed in a vertically extending, air tight relationship with adjacent finned tubes being connected along their lengths. It is understood that the plate 20 and the partitions 64 and 65 can be formed in a similar manner.

A steam drum 80 (FIG. 1) is located above the enclosure 10 and, although not shown in the drawings, it is understood that a plurality of headers are disposed at the ends of the various walls described above. Also, a plurality of downcomers and pipes, such as shown by the reference numerals 82 and 84, respectively, are utilized to establish a steam and water flow circuit through the tubes 78 forming the aforementioned water tube walls, along with connecting feeders, risers, headers, etc. The boundary walls of the cyclone separator 26, the heat exchanger tubes 60 and the tubes forming the reheater 38 and the superheater 40 are steam cooled while the economizers 42 and 44 receive feed water and discharges it to the drum 80. Water is passed in a predetermined sequence through this flow circuitry to convert the water to steam and heat the steam by the heat generated by combustion of the particulate fuel material in the furnace section 54.

In operation, particulate fuel material and a sorbent material (hereinafter referred to as "solids") are introduced into the furnace section 54 through the feeder system 25. Alternately, sorbent may also be introduced independently through openings in furnace walls 12, 14, 16a and 16b. Air from an external source is introduced at a sufficient pressure into that portion of the plenum 24 extending below the furnace section 54 and the air passes through the nozzles 20 disposed in the furnace section 54 at a sufficient quantity and velocity to fluidize the solids in the latter section.

A lightoff burner (not shown), or the like, is provided to ignite the fuel material in the solids, and thereafter the fuel material is self-combusted by the heat in the furnace section. The mixture of air and gaseous products of combustion (hereinafter referred to as "flue gases") passes upwardly through the furnace section 54 and entrains, or elutriates, a majority of the solids. The quantity of the air introduced, via the air plenum 24, through the nozzles 20 and into the interior of the furnace section 54 is established in accordance with the size of the solids so that a circulating fluidized bed is formed, i.e. the solids are fluidized to an extent that substantial entrainment or elutriation thereof is achieved. Thus the flue gases passing into the upper portion of the furnace section 54 are substantially saturated with the solids and the arrangement is such that the density of the bed is relatively high in the lower portion of the furnace section 54, decreases with height throughout the length of this furnace section and is substantially constant and relatively low in the upper portion of the furnace section.

The saturated flue gases in the upper portion of the furnace section 54 exit into the duct 28 and pass into the cyclone separator(s) 26. In each separator 26, the solids are separated from the flue gases and the former passes from the separator through the dipleg 63 and into the subenclosure 62. The cleaned flue gases from the separator 26 exit, via the duct 30, and pass to the heat recovery section 32 for passage through the enclosure 34 and across the reheater 38, the superheater 40, and the economizers 42 and 44, before exiting through the outlet 46 to external equipment.

The separated solids from the diplets 63a, 63b and 63c enter the inlet compartment 62. Air or gas is injected into the areas defined by the partitions 66a, 66b and 66c, via the conduits 70 under control of the valves 74 and air or gas is injected into the remaining portion of the section of the plenum 24 extending below the inlet compartment 62, via the conduit 72, under control of the valve 76. Thus, the separated solids flow from the separator 26, through the inlet compartment 62 and into the heat exchanger enclosure 56, via the openings 52a in the partition 52. Air is passed into the sections of the plenum 24 (FIG. 3) extending below the compartments 56a and 56c, respectively, and is discharged through the corresponding nozzles 20 into the latter compartments. Thus, the solids in the compartments 56a and 56c are fluidized and pass in a generally upwardly direction across the heat exchange tubes 60a and 60b before exiting, via the openings 50a associated with the latter compartments, into the chamber 58 (FIGS. 1 and 2). The solids mix in the chamber 58 before they exit, via the lower openings 14a formed in the rear wall 14, back into the furnace section 54.

Thus, the solids flow in a direction shown by the flow arrow in FIG. 5, i.e., through the openings 52a in the lower portion of the wall 52 into the lower portion of the chambers 56a and 56c, then upwardly across the tubes 60 before passing into the upper portion of the chamber 58 via the openings 50a. In the chamber 58 the solids pass downwardly, then exit through the lower openings 14a in the rear wall and pass into the lower portion of the furnace section 54.

The vent pipe 59 equalizes the pressure in the heat exchange enclosure 56, and therefore the outlet chamber 58, to the relatively low pressure in the furnace section 54. Thus the fluidized solids level in the outlet chamber 58 establishes a solids head differential which drives the solids through the openings 14a to the furnace section 54.

It is understood that a drain pipe hopper or the like may be provided on the plate 22 as needed for discharging spent solids from the furnace section 54 and the heat exchanger enclosure 56 as needed.

Feed water is introduced to and circulated through the flow circuit described above in a predetermined sequence to convert the feed water to steam and to reheat and superheat the steam. To this end, the heat removed from the solids in the heat exchanger enclosure 56 can be used to provide reheat and/or full or partial superheat. In the latter context the two groups of tubes 60a and 60b in each of the heat exchanger sections 56a and 56c can function to provide intermediate and finishing superheating, respectively, while the primary superheating is performed in the heat recovery area 32.

Since, during the above operation, fluidizing air is not introduced into the section of the plenum 24 extending below the heat exchanger compartment 56b, the separated solids in the latter compartment are thus defluidized. This, plus the fact that opening 50b in the partition 50 is at a greater height than the openings 50a, very little, if any, flow of solids through the heat exchanger compartment 56b occurs. However, during initial start up and low load conditions the fluidizing air to the section of the plenum 24 extending below the compartment 56, and therefore to the latter compartment, is turned on; while the air flow to the sections of the plenum 24 extending below the heat exchanger compartments 56a and 56 is turned off. This allows the solids in the heat exchanger compartments 56a and 56c to slump and therefore seal this volume from further flow, while the solids from the inlet compartment 62 pass directly through the heat exchanger compartment 56b, through the opening 50b in the partition 50 as shown by the dashed arrow in FIG. 5, through the outlet chamber 58 and to the furnace section 54. Since the heat exchanger compartment 56b does not contain heat exchanger tubes, it functions as a bypass so that start up and low load operation can be achieved without exposing the tubes 60 in the heat exchanger compartments 56a and 56c to the hot recirculating solids.

Several advantages result in the system of the present invention. For example, the heat exchange efficiency in the heat exchange enclosure is relatively high and a uniform discharge of solids to the furnace section is insured due to the uniform distribution and flow of the separated solids through the subenclosure and the chamber 58. Also the separated solids from the separators are introduced directly into the subenclosure 62, thus eliminating the need for a J-valve and associated componentary. Also, the location and number of cyclone separators can be varied in accordance with particular design requirements. Further, the air or gas flow into the partitions 66a and 66c extending in line with the diplegs 63a and 63c, respectively, can be regulated by the valves 74 independently of the flow into the remaining portions of the inlet compartment 62. Also, the air or gas flow into the partitions 66a and 66c can be carefully controlled so as to improve the flow and distribution of the separated solids through the inlet compartment, yet not interfere with, or affect the operation of, the separators 26.

It is understood that several options and variations may be made in the foregoing without departing from the scope of the invention. For example, drain pipes, or the like. (not shown) can be provided that extend from the plenum 24 below the inlet compartment 62 and the heat exchanger compartment 56 for controlling the recycle rate. Also, the opening 52b and the opening 50a that communicates with the compartment 56b can be provided with a gate valve, or the like (not shown) to block these openings and therefore prevent the flow of the separated solids therethrough during normal operation. Further the heat removed from the solids in the recycle heat exchanger enclosure can be used for heating the system fluid in the furnace section or the economizer, etc. Also, other types of beds may be utilized in the furnace such as a circulating transport mode bed with constant density through its entire height or a bubbling bed, etc. Also, a series heat recovery arrangement can be provided with superheat, reheat and/or economizer surface, or any combination thereto. Further, the number and/or location of the separators and therefore the number bypass channels in the recycle heat exchanger can be varied. Still further, the number of openings through which the solids pass in the partitions and the walls described above can vary in accordance with particular design requirements.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed combustion system comprising an enclosure, means defining a furnace section and a recycle heat exchange section in said enclosure, means for dividing said recycle heat exchange section into an inlet compartment and a heat exchange compartment, means for introducing combustible particulate material into said furnace section, means for fluidizing said particulate material in said furnace section to promote the combustion of said particulate material, separating means for receiving a mixture of flue gases and entrained particulate material from said furnace section and separating said entrained particulate material from said flue gases, a heat recovery section for receiving said separated flue gases, dipleg means for passing said separated material directly from said separating means to the interior of said inlet compartment, heat exchange means disposed in at least a portion of said heat exchange compartment, means for introducing air or gas into said inlet compartment in a flow path aligned with the flow path of said separated material from said dipleg means, means for passing said separated material from said inlet compartment to said heat exchanger compartment, and means for passing said separated material from said heat exchange compartment to said furnace section.

2. The system of claim 1 further comprising means for controlling the flow of said air of gas into said inlet compartment.

3. The system of claim 1 further comprising means defining a bypass passage in said heat exchange compartment which does not contain said heat exchange means, and mean for passing said separated material from said inlet compartment, through said bypass passage and to said furnace section.

4. The system of claim 3 further comprising means for selectively directing said separated material through said bypass passage or the remaining portion of heat exchange compartment.

5. The system of claim 3 further comprising means for selectively introducing air to said heat exchange compartment or to said bypass passage to fluidize the separated material therein to permit the flow of said separated material through said heat exchange compartment or through said bypass passage, respectively.

6. The system of claim 1 further comprising means for introducing air or gas into an area of said inlet compartment surrounding said aligned flow path of air or gas from said first mentioned air introducing means.

7. The system of claim 1 further comprising means for introducing air or gas to said recycle heat exchange section for fluidizing the separated material in said recycle heat exchange section to seal against the backflow of said separated material from said furnace section through said dipleg means and back to said separating means.

8. The system of claim 1 wherein said means for defining said furnace section and said recycle heat exchange section comprises a partition disposed in said enclosure.

9. The system of claim 8 wherein said means for passing said separated material from said heat exchange compartment to said furnace section comprises openings formed in the lower portion of said partition.

10. The system of claim I wherein said means for defining said inlet compartment and said heat exchange compartment comprises a partition disposed in said enclosure.

11. The system of claim 10 wherein said means for passing said separated material from said inlet compartment to said heat exchange compartment comprises openings formed in the upper portion of said partition.

12. The system of claim 1 wherein at least a portion of the walls of said enclosure are formed by tubes, and further conforming fluid flow circuit means for passing fluid through said tubes to transfer heat generated in said furnace section to said fluid.

13. The system of claim 12 further comprising means for transferring the heat removed from said separated material to said fluid flow circuit means.

14. The system of claim 1 wherein said fluidizing means comprises means for introducing fluidizing air or gas to said furnace section at a velocity sufficient to form a circulating bed.

15. A fluidized bed combustion method comprising the steps of forming a furnace section and a recycle heat exchange section in an enclosure, introducing a combustible particulate material into said furnace section, dividing said recycle heat exchange section into an inlet compartment and a heat exchange compartment, means for fluidizing said particulate material in said furnace section to promote the combustion of said particulate material, passing a mixture of flue gases and entrained particulate material from said furnace section, separating said entrained particulate material from said flue gases, passing said separated gases to a heat recovery section, passing said separated material through a dipleg directly to the interior of said inlet compartment of said recycle heat exchange section, introducing air or gas into said inlet compartment in a flow path aligned with the flow path of said separated material from said dipleg to control the flow of said separated material, passing said separated material from said inlet compartment to said heat exchanger compartment, removing heat from said separated material in said heat exchange compartment, and passing said separated material from said heat exchange compartment to said furnace section.

16. The method of claim 15 further comprising the steps of controlling the flow of said air or gas into said inlet compartment.

17. The method of claim 15 further comprising the steps of defining a bypass passage between said inlet compartment and said furnace section, and passing said separated material from said inlet compartment, through said bypass passage and to said furnace section without passing through said heat exchange compartment.

18. The method of claim 17 further comprising the steps of selectively directing said separated material through said bypass passage or said heat exchange compartment.

19. The method of claim 16 further comprising the steps of selectively introducing air to said heat exchange compartment or to said bypass passage to fluidize the separated material therein to permit the flow of said separated material through said heat exchange compartment or through said bypass passage, respectively.

20. The method of claim 15 further comprising the steps of introducing air or gas into an area of said inlet compartment surrounding said aligned flow path.

21. The method of claim 15 further comprising the steps of introducing air or gas to said recycle heat exchange section for fluidizing the separated material in said recycle heat exchange section to seal against the backflow of said separated material.

22. The method of claim 15 wherein at least a portion of the walls of said enclosure are formed by tubes, and further comprising step of passing fluid through said tubes to transfer heat generated in said furnace section to said fluid, and further passing said fluid in a fluid flow circuit for generating steam.

23. The method of claim 22 further comprising the step of transferring the heat removed from said separated material to said fluid flow circuit.

24. The method of claim 15 wherein said step of fluidizing includes introducing fluidizing air or gas to said furnace section at a velocity sufficient to form a circulating bed.

* * * * *

UNITED STATES PATENT AND TRADEMARK OFFICE
CERTIFICATE OF CORRECTION

PATENT NO. : 5,140,950

DATED : August 25, 1992

INVENTOR(S) : Iqbal F. Abdulally

It is certified that error appears in the above-identified patent and that said Letters Patent is hereby corrected as shown below:

On the title page: Item [75]

Please change the inventor's name from Igbal F. Abdulally to Iqbal F. Abdulally.

Column 5, line 27, after "enclosure 10", insert --.--.

Signed and Sealed this

Eighth Day of February, 1994

Attest:

BRUCE LEHMAN

Attesting Officer     Commissioner of Patents and Trademarks